(12) United States Patent
Hattori

(10) Patent No.: US 7,231,909 B2
(45) Date of Patent: Jun. 19, 2007

(54) AIR INTAKE APPARATUS AND CONTROL APPARATUS FOR AN INTERNAL COMBUSTION ENGINE

(75) Inventor: Shogo Hattori, Kawachi-gun (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/553,681

(22) PCT Filed: Apr. 19, 2004

(86) PCT No.: PCT/JP2004/005564

§ 371 (c)(1),
(2), (4) Date: Oct. 17, 2005

(87) PCT Pub. No.: WO2004/094798

PCT Pub. Date: Nov. 4, 2004

(65) Prior Publication Data

US 2006/0207571 A1    Sep. 21, 2006

(30) Foreign Application Priority Data

Apr. 21, 2003  (JP) ............................ 2003-115909

(51) Int. Cl.
*F02D 41/18* (2006.01)
*F02D 35/00* (2006.01)

(52) U.S. Cl. ..................................... 123/494; 73/118.2

(58) Field of Classification Search ................ 123/478, 123/480, 488, 494; 73/118.2; 702/45
See application file for complete search history.

(56) References Cited

U.S. PATENT DOCUMENTS

| 4,125,015 | A | * | 11/1978 | Di Nunzio et al. | ........ 73/118.2 |
| 4,751,907 | A | * | 6/1988 | Yamamoto et al. | ......... 123/694 |
| 4,869,222 | A | * | 9/1989 | Klassen | ...................... 123/494 |
| 5,117,795 | A | * | 6/1992 | Ohsuga et al. | .............. 123/494 |
| 5,419,301 | A | * | 5/1995 | Schechter | ................... 123/673 |
| 5,497,329 | A | * | 3/1996 | Tang | ......................... 73/118.2 |
| 5,555,870 | A | * | 9/1996 | Asano | ........................ 73/118.2 |
| 6,931,840 | B2 | * | 8/2005 | Strayer et al. | ................. 60/285 |

FOREIGN PATENT DOCUMENTS

| JP | 61-157741 | 7/1986 |
| JP | 4-15388 | 3/1992 |
| JP | 11-223543 | 8/1999 |
| JP | 2001-234798 | 8/2001 |
| JP | 2003-262546 | 9/2003 |

* cited by examiner

Primary Examiner—T. M. Argenbright
(74) Attorney, Agent, or Firm—Squire, Sanders & Dempsey L.L.P.

(57) ABSTRACT

In an air intake apparatus for an internal combustion engine providing a throttle body for each of a plurality of air intake passages provided for each cylinder of the internal combustion engine, an air flow meter which measures an air volume suctioned into a cylinder corresponding to the air intake passage is provided on a part of the insides of the plurality of air intake passages.

4 Claims, 2 Drawing Sheets

AIR INTAKE APPARATUS AND CONTROL APPARATUS FOR AN INTERNAL COMBUSTION ENGINE

TECHNICAL FIELD

This invention relates to an air intake apparatus for an internal combustion engine with fuel injection which provides an air intake passage and a throttle body for each cylinder, and a control apparatus which controls the fuel injection. Priority is claimed on Japanese Patent application No. 2003-115909, filed Apr. 21, 2003, the content of which is incorporated herein by reference.

BACKGROUND ART OF THE INVENTION

Some internal combustion engines for vehicles provide a throttle valve at the upstream side of intake manifolds (air intake passages), and provide a fuel injection valve and an air flow rate sensor at the downstream side of the throttle valve (for example, refer to Japanese Examined Patent Application, Second Publication No. H04-15388). An intake air volume signal which is an output from the air flow rate sensor is input to a control circuit, and a fuel injection quantity is calculated in response to the operational state of the internal combustion engine. In addition, an injection quantity signal based on the calculated fuel injection quantity is output from a control circuit to control the operation of the fuel injection valve.

Internal combustion engines for racing cars and motorcycles, for which a fast-response to the throttle operation is considered to be important, do not use intake manifolds but provide an individual air intake passage for each cylinder. Each air intake passage provides a throttle body. In this case, when throttle valve openings are small, fuel injection is performed based on an output from a pressure sensor provided on each air intake passage and the engine speed; and when the throttle valve openings are large, fuel injection is performed directly in response to the opening and the engine speed.

However, providing a pressure sensor for each cylinder increases the number of components, increasing the cost. Also, determining fuel injection quantity based only on the openings and the engine speed when the throttle valve openings are large has disadvantages in fuel consumption and in reduction of exhaust gas.

The present invention has been realized in view of the above-stated situations and has an object to provide an air intake apparatus and a control apparatus for an internal combustion engine providing an air intake passage and a throttle body for each cylinder, with a fast response and optimum fuel injection, with a small number of components.

DISCLOSURE OF INVENTION

The present invention provides an air intake apparatus for an internal combustion engine. The air intake apparatus includes a plurality of air intake passages provided at each cylinder of a multi-cylinder internal combustion engine and a throttle body provided at each of the plurality of air intake passages, wherein an air flow rate sensor for measuring air volume being suctioned into a cylinder corresponding to the air intake passage is provided on a part of the insides of the plurality of air intake passages.

The present invention also provides a control apparatus for an internal combustion engine. The control apparatus includes: a plurality of air intake passages provided at each cylinder of a multi-cylinder internal combustion engine; a throttle body provided at each of the plurality of air intake passages; an air flow rate sensor being provided on a part of the insides of the plurality of air intake passages and measuring air volume being suctioned into a cylinder corresponding to the air intake passage; and a control section for calculating air volume suctioned into other cylinders by multiplying air volume measured by the air flow rate sensor by predetermined coefficients, calculating the fuel injection quantity into each cylinder, and outputting a signal to a fuel injector of the internal combustion engine.

According to the air intake apparatus of the above-described internal combustion engine, the air volume suctioned into the cylinder (cylinder provided with the air flow rate sensor) corresponding to the air intake passage provided with the air flow rate sensor is measured directly, and air volumes suctioned into other cylinders are estimated. Thus, fuel injection quantity into each cylinder can be controlled. Incidentally, a part of the insides of a plurality of the air intake passages means one or more but less than all the air intake passages.

That is, with the control apparatus of the above-described internal combustion engine, it becomes possible to constitute a control apparatus to calculate air volume suctioned into cylinders other than the cylinder provided with the air flow rate sensor by multiplying the air volume measured by the air flow rate sensor by a predetermined coefficient, to calculate the fuel injection quantity into each cylinder based upon the calculated value and the measured value of the air flow rate sensor, and to output signals to fuel injectors.

The air flow in the air intake passage changes almost in the same manner as the opening of the throttle valve of the throttle body and the engine speed changes. Thus, by multiplying the air volume measured by the air flow rate sensor by coefficients based on the rate of chronological variation of the throttle valve openings or the engine speed, the air volumes suctioned into cylinders other than the cylinder provided with the air flow rate sensor can be estimated.

Also, by using an air flow rate sensor which has high detection sensitivity compared with a pressure sensor, the response of the internal combustion engine can be enhanced without having to control fuel injection based only on the throttle valve opening and the engine speed. In other words, fuel injection can be performed based on the air volume measured by the air flow rate sensor and the air volume estimated therefrom even when the throttle valve openings are large.

BEST MODE FOR CARRYING OUT THE INVENTION

An embodiment of the present invention will be explained below based on the drawings.

Figure 1:
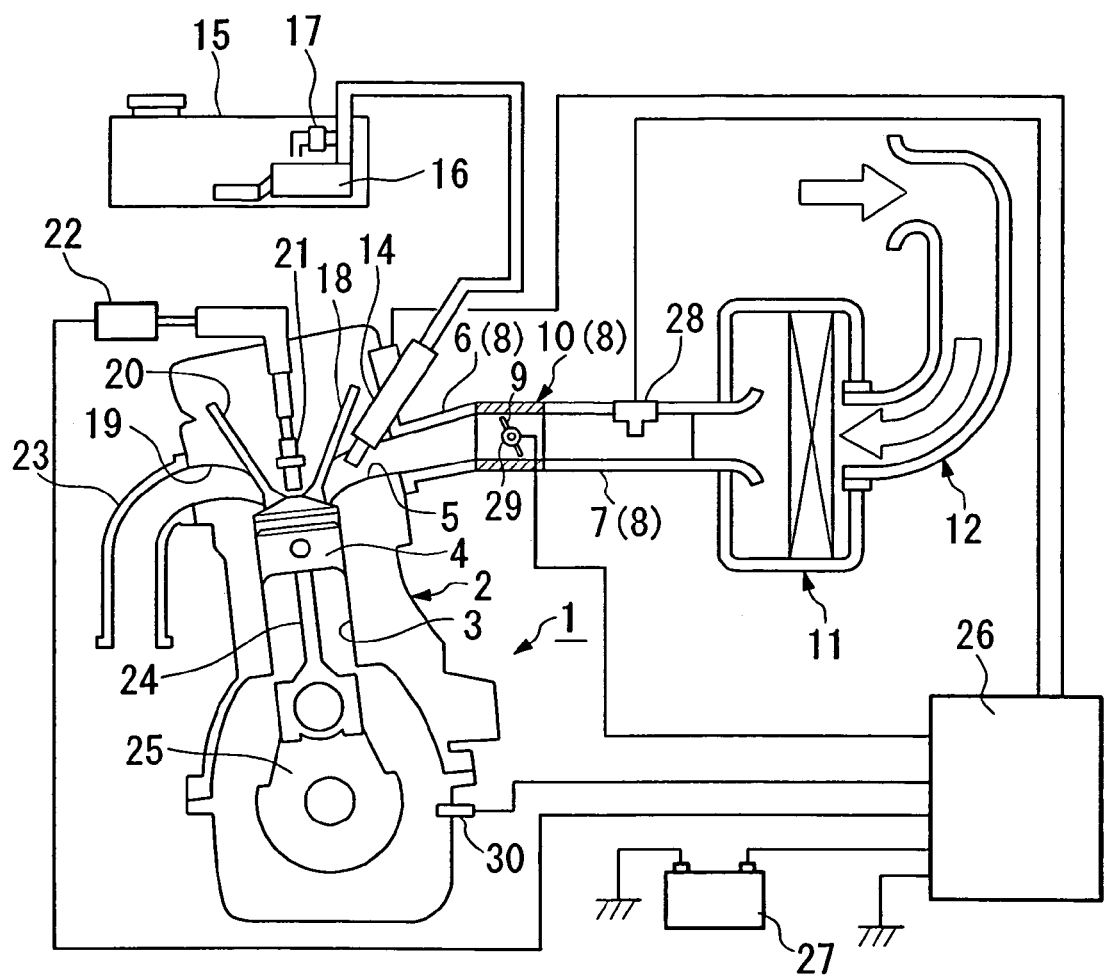
FIG. 1 is a block diagram showing an internal combustion engine according to an embodiment of the present invention.

As shown in FIG. 1, an engine (internal combustion engine) 1 is a multi-cylinder reciprocating engine in which each piston 4 undergoes reciprocating linear motion in a plurality of cylinders 3 of an engine main body 2. The reciprocating motion of the piston 4 changes the volume in the cylinder 3, repeating each stroke of air intake, compression, combustion (expansion), and exhaust. An air intake pipe 6 is connected to an outside opening of an air intake port 5 corresponding to each cylinder of the engine main body 2. The upstream side of the air intake pipe 6 in the air intake direction is connected to a throttle body 10 having a throttle valve 9 carrying out an adjustment of air volume (intake air volume) suctioned into the engine 1. Also, the upstream side of each throttle body 10 is connected to a funnel 7 for rectification of air flow. Each air intake pipe 6, throttle body 10, and funnel 7 constitutes a plurality of air intake passages 8 provided at every cylinder of the engine 1. The upstream side of each funnel 7 is connected to an air cleaner case 11. The upstream side of the air cleaner case 11 is connected to an air intake duct 12.

The engine main body 2 provides an injector (combustion fuel injection apparatus) 14 for which an electromagnetic fuel injection valve facing inside of the air intake port 5 is provided for each cylinder, and the injector 14 injects predetermined quantity of fuel into the air flow in the air intake port 5. Each injector 14 is supplied with fuel which is pumped from a fuel tank 15 by a fuel pump 16 and pressure-regulated by a regulator 17.

Also, in the engine main body 2, each cylinder is provided with an air intake valve 18 for opening and closing an opening on the combustion chamber side of the air intake port 5, an exhaust valve 20 for opening and closing an opening on the combustion chamber side of an exhaust port 19, and a spark plug 21, an ignition electrode of which faces inside of the combustion chamber. High energy stored in an ignition circuit 22 is used for ignition by the spark plug 21. Opening and closing operations of each air intake valve 18 and exhaust valve 20 are controlled by a camshaft, not shown. The outside opening of each exhaust port 19 is connected to an exhaust manifold 23.

Each piston 4 is connected to the crank pin of a crankshaft 25 via a connecting rod 24.

When the engine 1 is in an operational state, when the throttle valve 9 is opened, the introduced negative pressure of the cylinder in the intake stroke guides outside air from the air intake duct 12 into the air intake port 5 through the air cleaner case 11 and the air intake passage 8.

The air flow is mixed with the fuel injected from the injector 14 to form the fuel-air mixture, which is suctioned into the cylinder 3 in the intake stroke. The quantity of fuel injected from the injector 14 is adjusted in response to the air volume suctioned into the cylinder 3. And the combustion energy acquired from burning the fuel-air mixture suctioned into the cylinder 3 pushes the piston 4 down to rotate the crankshaft 25.

A control circuit (control section) 26 controls the fuel injection quantity, fuel injection timing, and ignition timing for the fuel-air mixture in the operational state of the engine 1. The control circuit 26 is a so-called ECU (electronic control unit), having a CPU (central processing unit) and a ROM (read only memory), being activated by the electric power supply of a battery 27. The control circuit 26 receives an output from an air flow meter (air flow rate sensor) 28 which can detect the air volume suctioned into the engine 1 as a mass flow and outputs from a throttle valve opening sensor 29 and a crankshaft rotation angle sensor 30 as input data to perform a predetermined process and outputs a command signal to each part.

Here, as for the air flow meter 28 suitable for this embodiment, there is a sensor in which a silicon substrate is evaporated with a platinum membrane, and the temperature of the platinum membrane is maintained constant by the passage of an electric current. When the air mass passing through the periphery of the platinum membrane increases, the temperature of the platinum membrane decreases, and thus the air flow meter 28 increases the electric current passing through the platinum membrane to maintain the temperature constant. On the other hand, when the air mass passing through the periphery of the platinum membrane decreases, the temperature of the platinum membrane increases, so that the air flow meter 28 reduces the electric current passing through the platinum membrane. Thus, the current value varies in proportion to fluctuations in the air mass passing through the periphery of the platinum membrane, so that it is possible to measure the air flow rate by monitoring the current value.

Figure 2:
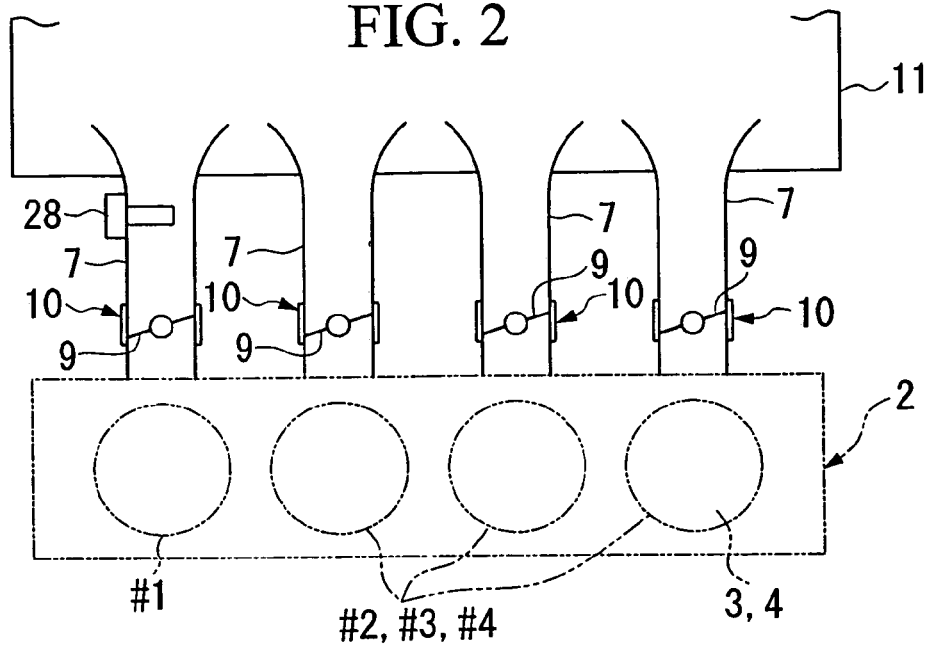
FIG. 2 is an explanatory diagram showing the configuration of an air intake passage and an air flow rate sensor of the engine.

As shown in FIG. 2, a plurality of (four in this embodiment) air intake passages 8 having the throttle bodies 10 are located side by side in the longitudinal direction to correspond to each cylinder (the cylinder 3 and the piston 4) of the engine 1. The air flow meter 28 is provided at the air intake passage 8 on the right most side among the plurality of air intake passages 8, and the air flow meter 28 is attached to the funnel 7. Thus, the air flow meter 28 is located on a more upstream side than the throttle valve 9.

Figure 3:
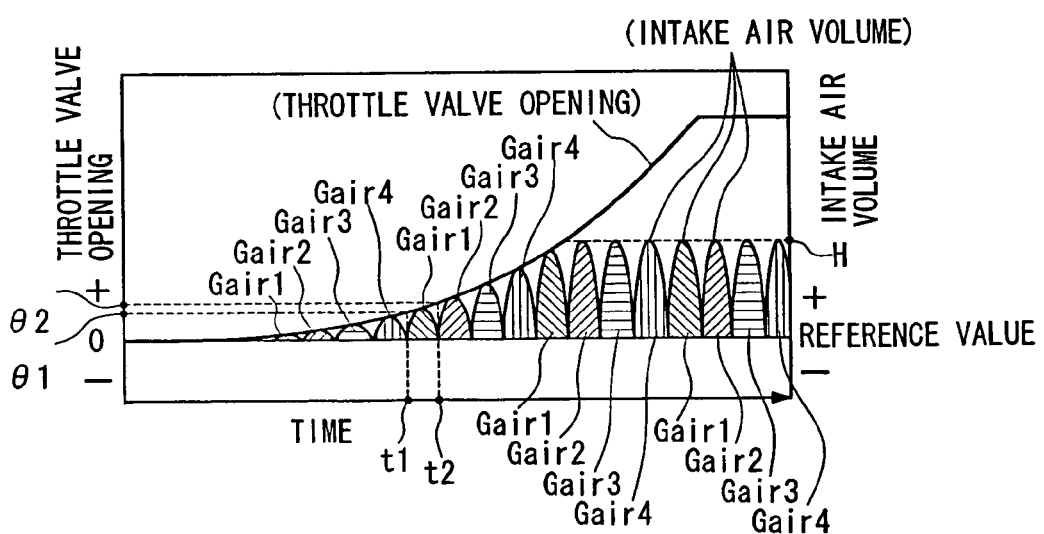
FIG. 3 is a graph showing the chronological variation of a throttle valve opening and an intake air volume of each cylinder.

Next, the operation of this embodiment will be explained with reference to FIGS. 2 and 3 below. In FIG. 3, a horizontal axis shows time and a longitudinal axis shows the change of the throttle valve opening and the change of the air volume suctioned into each cylinder which is accompanied by the change of the throttle valve opening. In FIG. 2 the left most side of the cylinders, i.e., the cylinder with the air flow meter, is denoted as cylinder #1; a cylinder which performs air intake next to the cylinder #1 is denoted as cylinder #2; and the following cylinders are denoted as cylinders #3 and #4 in order. The air volume suctioned into the cylinder #1 is indicated by the value converted from the output current from the air flow meter 28, and air volumes suctioned into the cylinders #2, #3, and #4 are indicated by values calculated by the control circuit 26. In addition, totals of the extent by which the air volume increases over a predetermined reference value are considered as air volumes Gair1, Gair2, Gair3, and Gair4 suctioned into each cylinder #1, #2, #3, and #4 in one intake stroke. The throttle valve opening is indicated by the value converted from the output current from the throttle valve opening sensor 29.

As shown in FIG. 3, as the throttle valve opening starts to increase, the air volume suctioned into each cylinder starts to increase at almost the same rate. At this time the engine speed starts to increase likewise. Here, the start time of air intake of the cylinder #1 is denoted as t1, and the throttle valve opening at the time t1 is denoted as θ1. Also, the start time of air intake of the cylinder #2 next to the cylinder #1 is denoted as t2, and the throttle valve opening at the time t2 is denoted as θ2. Incidentally, a phase between each cylinder is determined beforehand, so that the times when the cylinders #2, #3, and #4 start air intake can be determined by output information from the crankshaft rotation angle sensor 30.

When the rate of change of the throttle valve opening from the time t1 to the time t2, θ2/θ1, is denoted as dθ, by multiplying the air volume Gair1 suctioned into the cylinder #1 in one intake stroke by a coefficient K based on the rate of change dθ, the air volume Gair2 suctioned into the cylinder #2 in one intake stroke can be estimated by calculating. Also, the air volumes Gair3 and Gair4 suctioned into the cylinders #3 and #4 in one intake stroke can be estimated by calculating likewise.

Air volume suctioned into each cylinder increases at the same rate as the throttle valve opening, however, when the air volume reaches a saturation value (H in FIG. 3) of the air intake apparatus of the engine 1, the air volume maintains a certain value even though the throttle valve opening increases. Therefore, the air volumes Gair1, Gair2, Gair3, and Gair4 suctioned into cylinders #1, #2, #3, and #4, respectively, are constant, so that the fuel injection quantity is also controlled to be constant until the throttle valve opening is less than the opening when the air volume reaches the saturation value H. Incidentally, also when the throttle valve opening starts to decrease, the air volumes suctioned into each cylinder can be estimated by the above-described calculating.

Also, the air flow meter 28, which is made by evaporating a platinum membrane on a silicon substrate, has a high detection sensitivity compared with a pressure sensor which measures the air volume by detecting the change of pressure in the air intake passage 8. Not only that, the air flow meter 28 has a fast response and measurement accuracy because the heat capacity is small compared with, for example, an air flow meter using platinum wires. Thus, the response of the engine 1 can be enhanced without controlling fuel injection based only on the throttle valve opening and the engine speed. In other words, fuel injection can be performed based on the air volume measured by the air flow meter 28 and the air volume estimated therefrom even when the throttle valve opening is large.

Further, making a judgment as to whether the cylinder is in the intake stroke or not based on a leading edge of the air intake detected by the air flow meter 28 and angle detection information from the crankshaft rotation angle sensor 30 makes it possible to start fuel injection and ignition at an accurate timing. Here, the leading edge of the air intake means the time when the air volume which increases with the passage of time from the time of opening of the air intake valve 18 reaches a predetermined air volume rising value (for example, a value over the range of the pulsation of air in the air intake passage 8).

Furthermore, when the air intake valve 18 starts to close, the air volume which has increased over the predetermined air volume rising value starts to decrease. Here, the time when the air volume, which the air flow meter 28 detects, becomes less than a predetermined air volume lowering value which is set greater than the predetermined air volume rising value may be considered to be a falling edge of air intake, and the falling edge of air intake can be set so as to be considered as a time when air intake into the cylinder 3 ceases. Thus, the air volume from the leading edge of air intake to the falling edge of air intake, i.e., from the start of air intake to immediately before the air intake ceases, can be measured and calculated.

According to the above-described embodiment, by multiplying the air volume which the air flow meter 28 has measured by the coefficient based on the rate of chronological variation of the throttle valve opening, the air volume suctioned into cylinders other than the cylinder provided with the air flow meter can be estimated. Thus, while optimizing fuel injection, the number of components can be reduced compared with the case where the air flow meter 28 is provided to all cylinders, and the cost can also be reduced.

Also, fuel injection can be performed based on the air volume measured by the air flow meter 28 and the air volumes estimated therefrom even when the throttle valve opening is large by using the air flow meter 28 which has a high detection sensitivity while maintaining a fast response. Thus, fuel injection in response to the air volume can be performed regardless of the throttle valve opening, so that the fuel efficiency can be enhanced and the exhaust gas can be reduced.

Further, based on the leading edge of the air intake which the air flow meter 28 detects and the angle detection information from the crankshaft rotation angle sensor 30, fuel injection and ignition can be performed at an accurate timing.

Furthermore, by setting the falling edge of air intake which the air flow meter 28 detects as the time when the air intake into the cylinder 3 ceased, the air volume from the time when air intake has started to immediately before the time when air intake has ceased can be measured and calculated. Thus, fuel injection in response to the air volume can be performed in one cycle in the engine 1, so that the optimization of fuel injection can be performed in real time.

The present invention is not limited to the above-stated embodiment; but, for example, the air flow meter 28 may be provided with not only one air intake passage 8 but also the respective air intake passages 8 corresponding to cylinders different in phase, that is, the air flow meter 28 may be provided with one or more, and less than all the air intake passages 8, and still attain the same effects. Here, the engine 1 is not limited to a four-cylinder engine.

Also, the engine speed changes as the suctioned intake air volume changes, so that the air volume measured by the air flow meter 28 may be multiplied by a coefficient based on the rate of chronological variation of the engine speed to calculate air volumes suctioned into other cylinders.

Further, the air flow meter 28 may be located on the downstream side of the throttle valve 9. However, in the case of the above-described engine 1, the engine is in many cases a high-revving engine for two wheelers or the like, so that the length of the air intake pipe 6 is curbed to enhance the response, and an overlap between the exhaust stroke and the intake stroke is made long to cope with high revving. Thus, even at the upstream side of the throttle valve 9, the measurement error of the air volume is small and contamination caused by blowback of exhaust gas is small, so that the air flow meter 28 is preferably located on the upstream side of the throttle valve 9.

INDUSTRIAL APPLICABILITY

The present invention relates to an air intake apparatus for an internal combustion engine comprising a plurality of air intake passages provided at each cylinder of a multi-cylinder internal combustion engine and a throttle body provided at each of the plurality of air intake passages, wherein a part of an inside of the plurality of air intake passages provides an air flow rate sensor for measuring air volume being suctioned into a cylinder corresponding to the air intake passage.

The present invention also relates to a control apparatus for an internal combustion engine comprising a plurality of air intake passages provided at each cylinder of a multi-cylinder internal combustion engine and a throttle body provided at each of the plurality of air intake passages, comprising: an air flow rate sensor provided on a part of an inside of the plurality of air intake passages, the air flow rate sensor measuring air volume being suctioned into a cylinder corresponding to the air intake passage; and a control section for calculating air volume suctioned into other cylinders by multiplying air volume measured by the air flow rate sensor by predetermined coefficients, calculating the fuel injection quantity into each cylinder, and outputting a signal to a fuel injector of the internal combustion engine.

According to the air intake apparatus and the control apparatus of the internal combustion engine of the present invention, by multiplying the air volume measured by the air flow rate sensor by the coefficient based on the rate of chronological variation of the throttle valve opening or the engine speed, the air volume suctioned into cylinders other than the cylinder provided with the air flow rate sensor can be estimated. Thus, while optimizing fuel injection, the number of components can be reduced compared with the case where the air flow rate sensor is provided to all cylinders, and the cost can also be reduced.

Also, fuel injection can be performed based on the air volume measured by the air flow rate sensor and the air volumes estimated therefrom even when the throttle valve opening is large. Thus, fuel injection in response to the air volume can be performed regardless of the throttle valve opening, so that the fuel efficiency can be enhanced and the exhaust gas can be reduced.

Furthermore, by using both an air flow rate sensor and a rotation angle sensor such as a crankshaft and a camshaft, it becomes possible to perform fuel injection into each cylinder at an accurate timing. And it also becomes possible to measure and calculate the air volume and to perform fuel injection in response to the air volume in one cycle of the internal combustion engine, so that the optimization of fuel injection quantity can be performed in real time.

The invention claimed is:

1. An air intake apparatus for an internal combustion engine, comprising:
   a plurality of air intake passages provided at each cylinder of a multi-cylinder internal combustion engine;
   a throttle body provided at each of the plurality of air intake passages; and
   an air flow rate sensor for measuring air volume being suctioned into a cylinder corresponding to the air intake passage provided on a part of the insides of the plurality of air intake passages and
   a control section provided to calculate air volume suctioned into each of cylinders other than the cylinder provided with the air flow rate sensor by multiplying air volume measured by the air flow rate sensor by predetermined coefficients.

2. A control apparatus for an internal combustion engine, comprising:
   a plurality of air intake passages provided at each cylinder of a multi-cylinder internal combustion engine;
   a throttle body provided at each of the plurality of air intake passages;
   an air flow rate sensor being provided on a part of the insides of the plurality of air intake passages and measuring air volume being suctioned into a cylinder corresponding to the air intake passage; and
   a control section for calculating air volume suctioned into each of cylinders other than the cylinder provided with the air flow rate sensor by multiplying air volume measured by the air flow rate sensor by predetermined coefficients, calculating the fuel injection quantity into each cylinder, and outputting a signal to a fuel injector of the internal combustion engine.

3. The control apparatus for an internal combustion engine according to claim 1, wherein
   the air volume suctioned into each of the cylinders other than the cylinder provided with the air flow rate sensor is estimated by multiplying the air volume measured by the air flow rate sensor by coefficients based on the rate of chronological variation of the throttle valve openings or the engine speed.

4. The control apparatus for an internal combustion engine according to claim 2, wherein
   The air volume suctioned into each of the cylinders other than the cylinder provided with the air flow rate sensor is estimated by multiplying the air volume measured by the air flow rate sensor by coefficient based on the rate of chronological variation of the throttle valve openings or the engine speed.

* * * * *